US006757662B1

(12) United States Patent
Greenwald et al.

(10) Patent No.: US 6,757,662 B1
(45) Date of Patent: Jun. 29, 2004

(54) METHOD AND SYSTEM FOR DISPLAY ADVERTISEMENT QUALIFICATION AND NOTIFICATION

(76) Inventors: Richard L. Greenwald, 105 Calvert St., Harrison, NY (US) 10528; Alan Greenwald, 105 Calvert St., Harrison, NY (US) 10528

(*) Notice: Subject to any disclaimer, the term of this patent is extended or adjusted under 35 U.S.C. 154(b) by 521 days.

(21) Appl. No.: 09/641,972

(22) Filed: Aug. 21, 2000

(51) Int. Cl.[7] .............................................. G06F 17/60
(52) U.S. Cl. ....................................................... 705/14
(58) Field of Search ................................ 705/1, 10, 14

(56) References Cited

U.S. PATENT DOCUMENTS

| | | |
|---|---|---|
| 5,572,643 A | 11/1996 | Judson |
| 5,644,723 A | 7/1997 | Deaton et al. |
| 5,724,521 A | 3/1998 | Dedrick |
| 5,754,938 A | 5/1998 | Herz et al. |
| 5,918,214 A | 6/1999 | Perkowski |
| 5,933,811 A | 8/1999 | Angles et al. |
| 5,937,392 A | 8/1999 | Alberts |
| 5,948,061 A | 9/1999 | Merriman et al. |
| 5,974,398 A | 10/1999 | Hanson et al. |
| 5,991,735 A | 11/1999 | Gerace |
| 5,992,888 A | 11/1999 | North et al. |
| 5,995,943 A | 11/1999 | Bull et al. |
| 5,999,908 A | 12/1999 | Abelow |
| 5,999,912 A | 12/1999 | Wodarz et al. |
| 5,999,914 A * | 12/1999 | Blinn et al. .................... 705/26 |
| 6,009,410 A | 12/1999 | LeMole et al. |
| 6,029,195 A | 2/2000 | Herz |
| 6,055,513 A * | 4/2000 | Katz et al. ..................... 705/26 |
| 6,073,112 A * | 6/2000 | Geerlings ...................... 705/14 |
| 6,119,098 A | 9/2000 | Guyot et al. |
| 6,205,432 B1 | 3/2001 | Gabbard et al. |

FOREIGN PATENT DOCUMENTS

| | | | | |
|---|---|---|---|---|
| WO | WO 99/66707 | * | 12/1999 | ................ 705/14 X |
| WO | WO 00/33222 | * | 6/2000 | ................ 705/14 X |
| WO | WO 00/41520 | * | 7/2000 | ................ 705/14 X |

OTHER PUBLICATIONS

Supermarket web sites—good and bad by Richard Shulman; "Supermarket Business" v53, n4, p37; Apr. 1998.*
PMA Conference by Cole Corbin; "Supermarket News", p13; Mar. 1, 1999.*
Making things better for the shopper by Richard Shulman; "Supermarket Business" v54, n6, p37; Jun. 1999.*

* cited by examiner

Primary Examiner—Stephen Gravini
(74) Attorney, Agent, or Firm—Piper Rudnick LLP; Steven B. Kelber (57) ABSTRACT

A method and system is provided for triggering an advertisement for display via a computer network. One of a several part numbers is received from a user request. An advertisement to be displayed is triggered if (i) the user is associated with a pre-determined desired group corresponding to the triggered advertisement, and (ii) the user is not associated with a pre-determined no-show group corresponding to the triggered advertisement; and (iii) at least one of the received part numbers is included in the portion of part numbers. The triggering step further includes determining whether the triggered advertisement has exceeded a pre-determined maximum number of showings. An advertiser associated with the advertisement is notified of the triggered advertisement and the user. Further, responsive to the user request, stored information is searched for a part corresponding to at least one part number. Further, the user is classified by type within a vertical industry such as the airline industry.

24 Claims, 9 Drawing Sheets

METHOD AND SYSTEM FOR DISPLAY ADVERTISEMENT QUALIFICATION AND NOTIFICATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright right whatsoever.

BACKGROUND OF THE INVENTION

1. Field of the Invention

The present invention relates to method and systems for displaying targeted advertising and listings to web site users. More specifically, it relates to the qualification of an advertisement's display and the notification to the advertiser. Further, the invention relates to advertisements displayed based upon a unique part identification being queried, and the industry segment of the inquirer.

2. Background of the Invention

One of the major problems facing advertisers is directing their advertisement to the correct prospect at just the right time. The advent of the internet presents interesting possibilities for attempting to customize an advertisement. For example, U.S. Pat. No. 6,009,410, LeMole, concerns a method for presenting customized advertising to a user on the internet, where banner advertisements are selected from several different advertisers, and the customized page is determined from the user's specific area of interest based on demographic data. Similarly, U.S. Pat. No. 5,933,811, Angles, and U.S. Pat. No. 5,948,061, Merriman, concern other methods for delivering customized or targeted advertisements over the internet. Angles selects a customized advertisement based on a consumer profile (cookie). Merriman also uses a cookie, wherein an advertisement server determines which of several advertisements to match to the user.

It is also now conventional to utilize an internet user's activity such as searching to trigger a particular advertisement. See, for example, U.S. Pat. No. 5,937,392, Alberts.

It is also generally known to utilize the internet to search for a product. In one variation, a user can type in a product number, and a predesignated information source, such as an advertisement, is displayed to the user. See U.S. Pat. No. 5,918,214, Perkowski.

None of these conventional advertising methods envision a specialized user. More specifically, traditional internet advertising frequently does not advertise close to the point of purchase, concerning the particular product use of interest to users on a vertical portal or web site. ("Vertical" is used herein to designate a web site or portal or the like which is directed to a specific industry or type of user rather than an undifferentiated member of the general population.)

Thus, there remains a need for a display advertisement system which utilizes unique qualities of certain industries in order to qualify an advertisement.

BRIEF SUMMARY OF THE INVENTION

It is therefore an object of the present invention to provide an improved method for determining and directing advertisements on the internet, via user qualification. It is an optional feature of the present invention that it notifies an advertiser whose advertisement was displayed to a particular user.

According to the invention, there is provided a method and system for providing an advertisement for display on a computer system. One of several part numbers is received from a user request. An advertisement to be displayed is triggered if (i) the user is associated with a pre-determined desired group corresponding to the triggered advertisement, and (ii) the user is not associated with a pre-determined no-show group corresponding to the triggered advertisement. The triggering step further includes determining whether the triggered advertisement has exceeded a pre-determined maximum number of showings. An advertiser associated with the advertisement is notified of the triggered advertisement and the user. Optionally, the notifying step is substantially simultaneous with the triggering step, or is subsequent to the triggering step. Further, responsive to the user request, stored information is searched for a part corresponding to at least one part number. Also, the triggered advertisement is transmitted to the user. Further, the user is classified by type within a vertical industry. Classification includes storing an indication from the user of one of several of subtypes for a vertical industry. For each of several advertisers, there are stored part numbers; for each of a portion of part numbers for at least one of the advertisers, there is stored the triggered advertisement; further, the advertisement is triggered if (iii) at least one of the received part numbers is included in the portion of part numbers. For each of the users including the user, the users are classified with a group corresponding to the triggered advertisement. Further, optionally, for a portion of a plurality of users including the user, the portion of users are classified with a group corresponding to a no-show group.

These and other objects, features and advantages of the present invention are readily apparent from the following drawings and detailed description.

BRIEF DESCRIPTION OF THE DRAWINGS

The invention is described in connection with the drawings.

DETAILED DESCRIPTION OF THE PREFERRED EMBODIMENT

Figure 1:
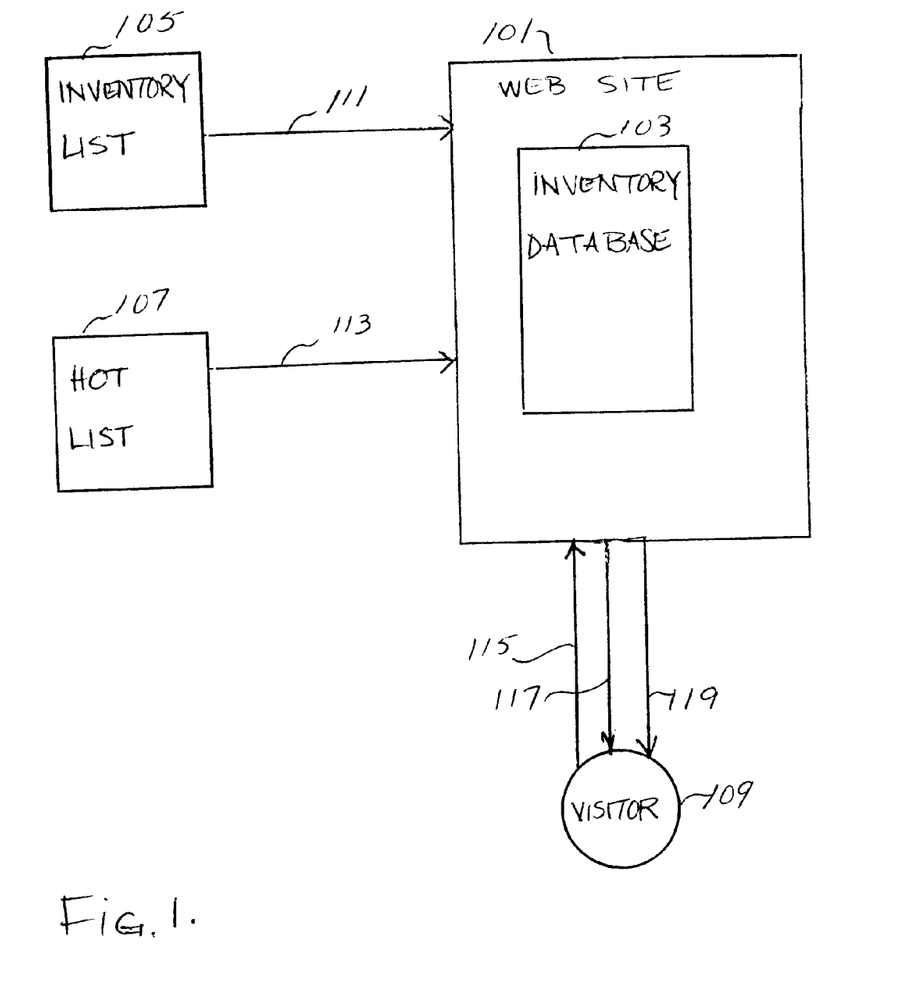
FIG. 1 is a block drawing of the system for display advertisement qualification.

FIG. 1 illustrates a block drawing of the display advertisement system, in which there is provided a web site 101, an inventory data base 103, an inventory list 105 and a hot list 107. The invention will be described in connection with the example of the aviation industry. Nevertheless, the invention also applies to other vertical industries which utilize mechanical devices that identify components by part number or keyword (referred to as "part identification"). Such vertical industries include aircraft, automobiles, boats, etc.

The vertical web site 101 or vertical portal includes an inventory data base 103. The inventory data base is intended to include information to permit a user or visitor to the vertical portal to search for a particular part. An appropriate data base is a SQL server database.

In order to populate the web site 101 with content, a supplier to the particular industry of interest will transmit an inventory list 105 of available inventory or repair capabilities. The inventory list should include part number, and any other desirable information, such as description, quantity and condition. As one example, "quantity" can be indicated as limited to request and condition should be "new". Other desirable, optional information includes, price, unit of measure, aircraft, serial numbers, etc. If the supplier offers a service, such as repair, the desired information is part number and description.

The web site 101 provides a searchable data base 103, available to visitors 109.

Each advertiser also may provide a hot list 107 of a subset of part numbers that will trigger a potential particular advertisement display. The hot list will correlate a particular advertisement to industry affiliations. In the hot list, a supplier lists part numbers that trigger advertisements. In the example aviation industry, the industry affiliations would include, for example, major airline, regional airline, helicopter segment, business aircraft segment, etc. These are specific interest groups within the aviation industry. Each of these interest groups might be interested in particular advertisements, or advertisers might be interested in directing particular advertisements to these interest groups.

Preferably, an advertiser could provide an optional "no-show" list of specific companies or individuals to whom a particular triggered or banner advertisement will not be displayed. Advertisements will be filtered such that "no show" companies (specified by e-mail address, domain name, or other identification criteria) are not shown advertisements.

Also, the system stores a number of advertising impressions which have been purchased, and are decremented for each impression. Advertisers may specify a daily maximum number of impressions for an advertisement.

Preferably, the inventory list 105, hot list 107 and visitor 109 inquiries are made via an inquiry page, through internet connections 111, 113, 115, 117, and 119. Alternatively, all or part of the inventory list, hot list, and user profiles may be made through other electronic methods.

Preferably, the inventory list and hot list are separate. A regular supplier user should provide its own inventory list, to be added to the database of available parts, and services for parts. An advertiser supplier user should provide additionally a hot list of part numbers, which are a subset of the inventory list, which trigger their advertisement. Users specify either a part or overhaul search then specify part number of interest, on an inquiry page.

Figure 4:
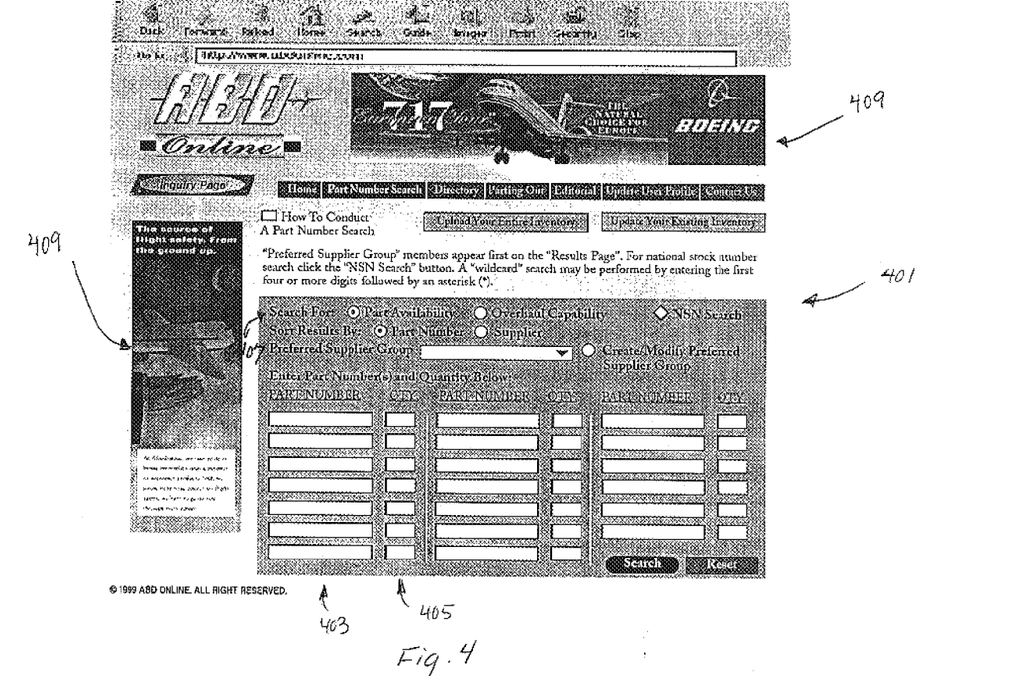
FIG. 4 is an example inquiry page of a user interface.
Figure 5:
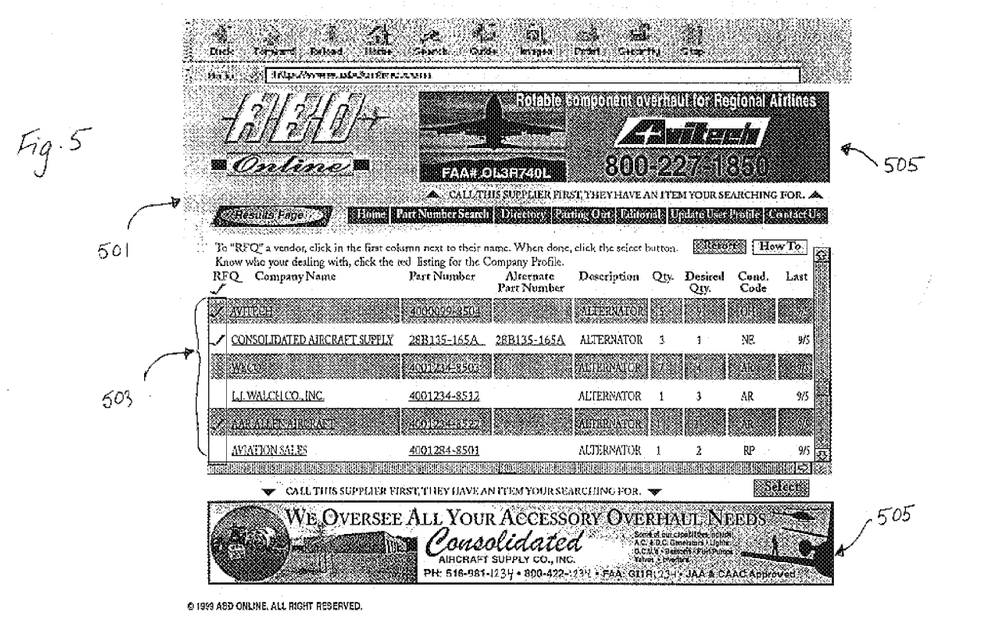
FIG. 5 is an example result page of a user interface.

FIG. 4 illustrates a sample inquiry page 401. The inquiry page allows the user to specify part number(s) 403, and optionally quantity 405, and search type 407 (part availability or overhaul capacity). One or more untargeted advertisements, such as the two banner advertisements in this example, may be displayed here. The system searches the database and displays a list of suppliers and part numbers on a result page. FIG. 5 illustrates sample result page 501, with a result list of suppliers and part numbers 503. The result list 503 preferably also includes information on any alternate part numbers, description, quantity, desired quantity and condition. The result page also includes one or more triggered advertisements 505, if appropriate. This page can readily be used by the user to transmit an inquiry, or request for quote, to the supplier. The information selected on the result page, for a particular supplier, is sent to the supplier.

Figure 6:
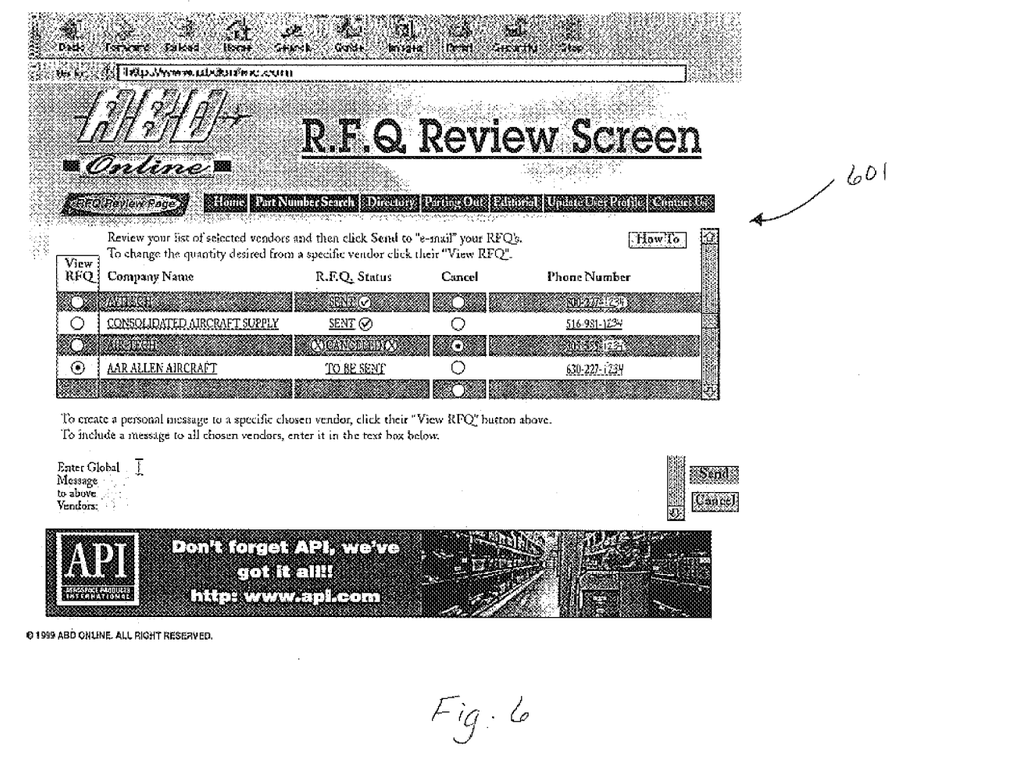
FIG. 6 is an example RFQ review page of a user interface.

FIG. 6 illustrates a sample Request for Quote page, including a listing 601 showing the Company name, RFQ status (e.g., to be sent, sent, canceled), and other useful information.

Figure 2:
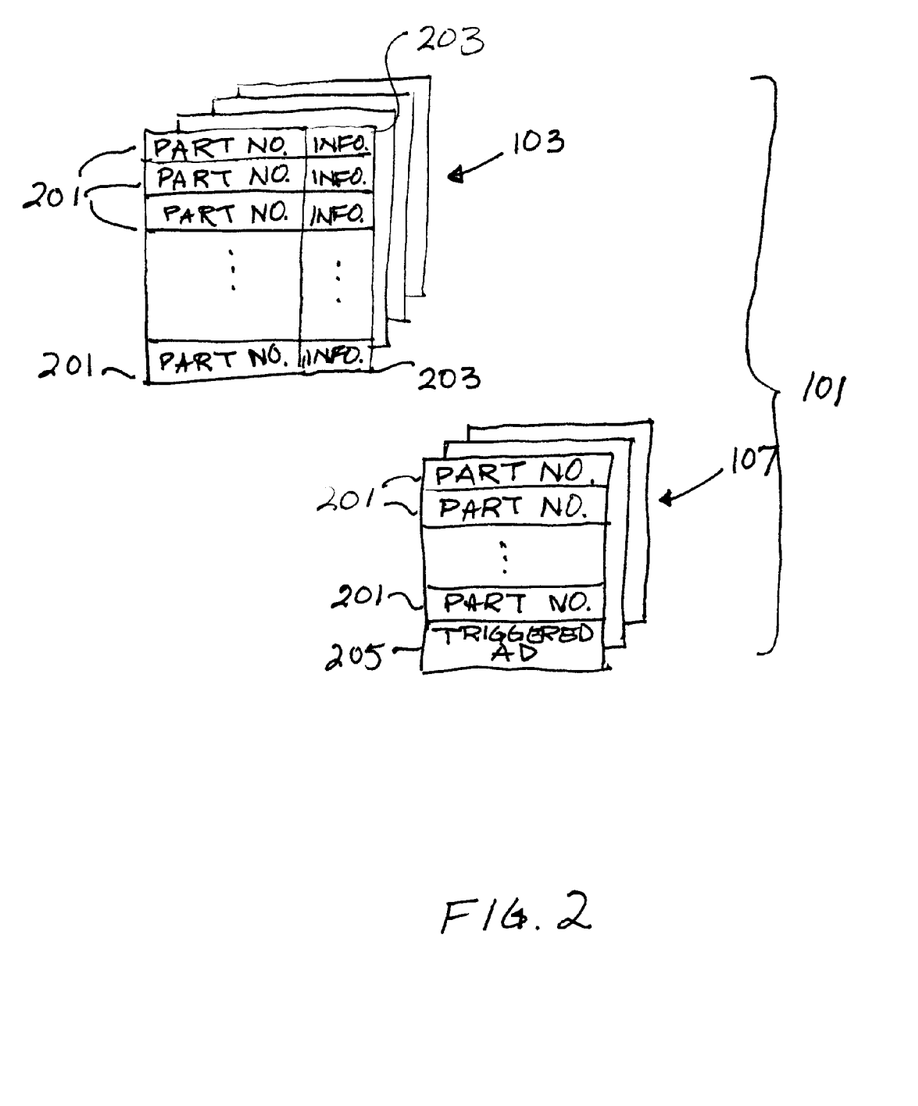
FIG. 2 illustrates the record and one potential data base for the display advertisement qualification system.

Reference is now made to FIG. 2. FIG. 2 illustrates a potential list of records and the inventory data base 103. In the preferred embodiment, the inventory data base 103 includes a searchable part number 201, and any other information related to the part number 203, correlated to each supplier. The hot lists 107 are collected and stored, and include information on part number 201; correlated to each supplier's hot list is a reference to a specific advertisement 205 that is to be triggered by a user search. Note that the inventory data base is searchable by part number. All hot part numbers are preferably kept in a separate table. The system compares the part number to the hot list, and then does a search.

Additional information that could be provided in the inventory data base include company name, alternate part number, and description. Further information may be entered such as part number quantity and condition. Company names are provided so that they are displayed as to the queried part number (condition, quantity, etc.—which are optional).

Figure 3:
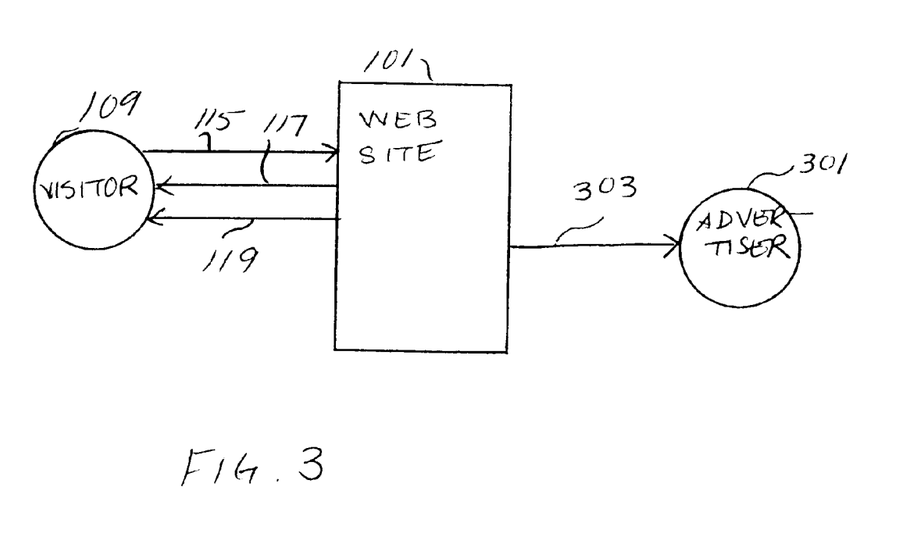
FIG. 3 is a block drawing illustrating the method of display advertisement qualification and notification.

Reference is now made to FIG. 3, illustrating a method for qualifying a display advertisement and providing notification. Here, a visitor 109 has transmitted a specification 115 to the web site 101 requesting either a part purchase or a repair search. Upon receipt of the query 115, the web site will search the inventory data base for part numbers supplied by vendors, will display data provided by relevant vendors, and will trigger a specific banner advertisement if certain criteria are met. In the preferred embodiment, the criteria are that the number is on the hot list, the user has the affiliation specified by the advertiser, and the user is not on the no-show list.

In the preferred embodiment, the search engine first compiles a list of suppliers who have or can repair that part number, then searches the hot list of the advertisers, which identifies special part numbers corresponding to the advertiser's inventory/capabilities.

The relevant advertisers are then grouped together into a display group, which is compared against the visitor's criteria.

The visitor has been profiled, preferably at an initial contact at the site, by a questionnaire which they complete. One of the questions to the visitor requests that the visitor indicate its industry affiliation, such as original equipment manufacturer, major airline, helicopter segment, business aircraft segment, etc. The industry affiliations are specific to the industry and could include, for example, automotive (affiliations including, for example, passenger cars, trucks, construction vehicles, racing vehicles, motorcycles) and boating industries (affiliations including, for example, pleasure boats, tankers, jet skies, water taxis, steam ships, fishing boats).

Of course, additional demographic and identification information could be collected about the visitor, including company, phone number, e-mail address and title. The information is collected and provided to the advertiser along with the queried part number(s).

If the specific visitor's industry affiliation matches the industry affiliation sought by the advertiser then the advertiser is kept in the display group. Similarly, if the visitor is a member of the advertiser's "no-show" list, then the advertiser is removed from the display group. Also, if the daily desired number of impressions for an advertiser's advertisement has not yet been achieved, the advertiser would be retained in the display group. In another version of the invention, an advertiser may identify specific users that may view advertisements and listings from that advertiser (the "show list").

The display group now contains the qualified display advertisements for the particular visitor. A number of algorithms may be used to select one or more of the display advertisements from the display group. For example, the application could randomly select advertisements from two different advertisers. A result page 117 would be transmitted to the visitor, and the advertisements would be transmitted to the visitor 119 in a banner or other type of advertisement.

Figure 7:
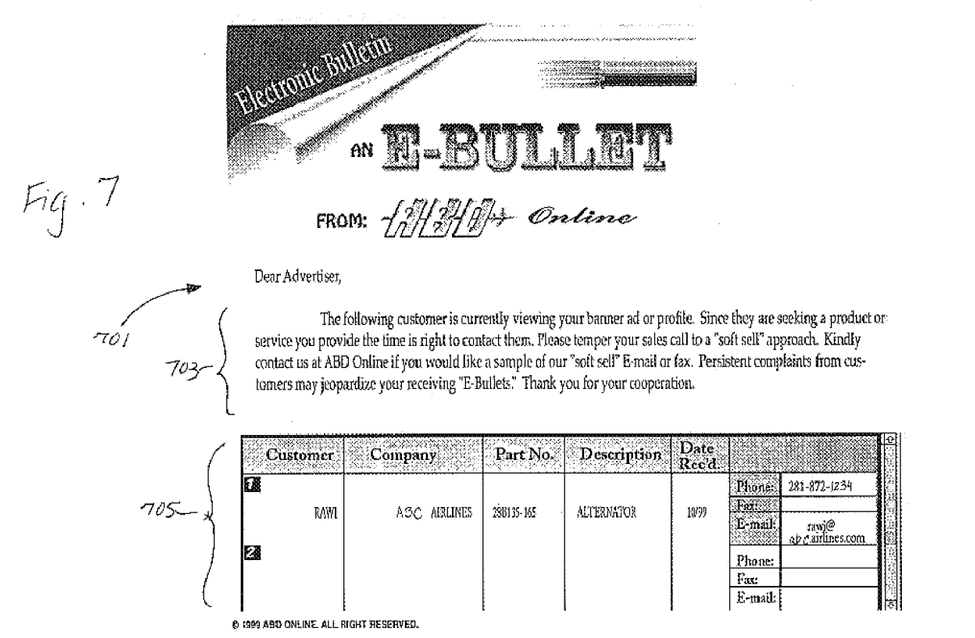
FIG. 7 is an example electronic bulletin to an advertiser.

Optionally, the web site notes the visitor's data from the visitor profile, including the part number requested. The web site 101 creates an e-mail message or other electronic notification with demographic and/or identification information, including user name, user company, triggering part number, part description as provided by the advertiser, inquiry date, phone/facsimile/e-mail of user. The e-mail message is then transmitted to the advertiser or advertisers for whom the advertisements were displayed. FIG. 7 illustrates an example electronic bulletin 701, including a text portion 703, and a list 705 of visitors and profile data.

In the preferred embodiment, buyers (users searching for a part or service) and suppliers (users listing parts or service offering) are not charged a fee. Advertisers may pay to have their listings displayed exclusively to certain specific users or groups, much the same way display advertisements are triggered and filtered. Suppliers who are advertising are charged a fee for the advertising service. In summary, according to the invention, users are classified by a subgroup within the vertical industry. Specifically, here the users classify themselves based on registration information. At the web site, a user searches for a particular part number or a particular type of part which would implicate a part number. The web site selects a particular advertisement to be displayed, based on a triggering part number and viewer filtering process. The trigger used for displaying the advertisement is as follows: for a user of a particular classification, indicating a particular part number will request a particular advertisement; the advertisement will be displayed, over time, for a particular number of impressions, but not necessarily for each consecutive user same classification.

Figure 8:
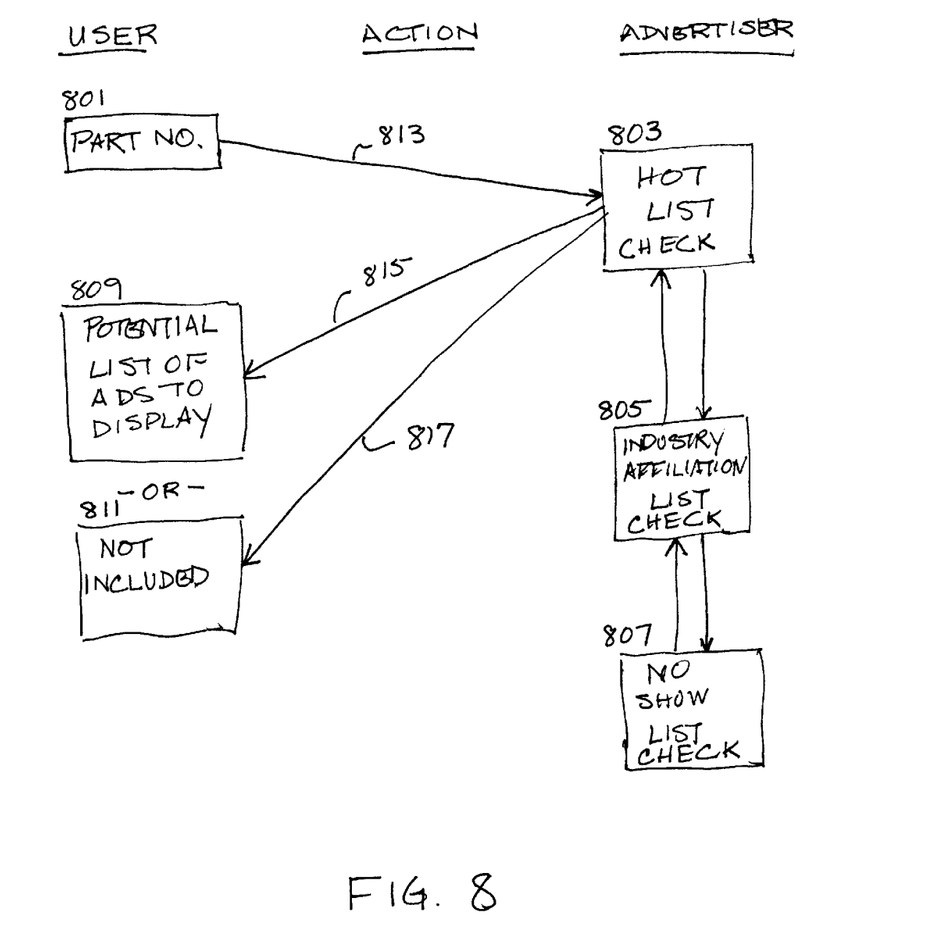
FIG. 8 is a block diagram illustrating flow of control for an inquiry.

FIG. 8 illustrates a flow of control for user part number searches and advertising displays. A user inputs a part number 801, which is received 813 by the system. The system checks the hot list 803 for the part number. If the part number is located in the hot list, the system checks the user's industry affiliation 805. Also, optionally, the system checks whether the user is on the no-show list 807. If the user is on the "no show list", the paid advertisement or listing is not shown. When these predetermined criteria are met, a potential list of advertisements to be displayed 809 is returned 815. Otherwise, the triggered advertisements are not included 811 and not returned 817.

Figure 9:
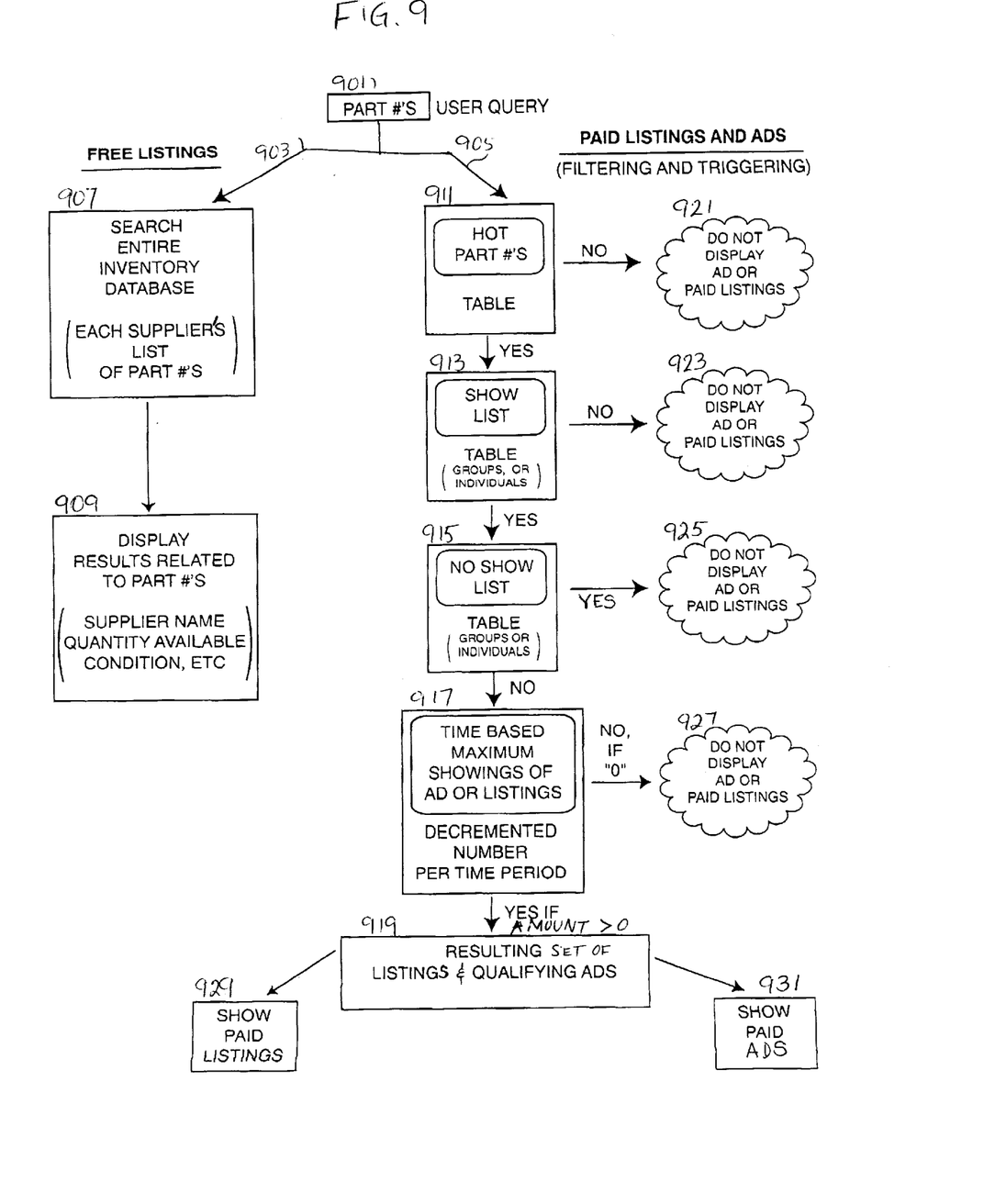
FIG. 9 is a block diagram illustrating another search and display process.

FIG. 9 illustrates the flow of control for a user part number searches and advertising displays. It will be understood that actual sequences may vary from those shown in the illustration. According to the preferred embodiment, there is a distinction between free listings and paid listings in advertisements. The free listings may always be displayed, whereas the paid listings and advertisements result in a filtering of user queries in order to determine whether an advertisement or paid listing should in fact be triggered. As illustrated, at Step 901, a user submits a part number query, which is transmitted to both a free listing search 903 and a paid listings and advertisements search 905. At Step 907, the list of part numbers for each supplier is searched in the entire inventory database, for those part numbers corresponding to the user's query. At Step 909, the results of the search are displayed, which are free listings including such items as supplier name, quantity available, condition, and so forth. The filtering and triggering search is as follows: at Step 911, the hot list or hot part numbers table is searched. If the user query's part number is not included in the hot part number's table, then the system does not display any advertisements or paid listings 921. If the queried part number is included in the hot part number table, then at Step 913, the show list table is searched for a match of the user's industry affiliations. If there is no match of the user industry affiliations in the show list table, the system does not display the advertisement or paid listing 923. If, on the other hand, there is a match in the show list, the system then searches the no show list to determine whether the user corresponds to certain criteria for the no show list, at Step 915. If the user does correspond to the no show list, or if all criteria are not met, then the system does not display an advertisement or paid listing at Step 925. If, on the other hand, the user does not correspond to the no show list, then the system determines whether the maximum number of showings of advertisements or listings has been reached. In the preferred embodiment, this is a time based maximum, which number is decremented each time period. Thus, if the maximum has been reached (the number equals zero), at Step 927, the system does not display the advertisement or paid listing. However, if the maximum number has not yet been reached, the advertisements corresponding to the part numbers and listings corresponding to the part numbers are determined at Step 919, and are added to the display and at Steps 929 and 931, meaning the paid listings and paid advertisements are displayed. All paid listings are preferably displayed. If space allows, all of the qualifying advertisements are displayed, otherwise, a subset of advertisements are displayed. The subset could be selected randomly.

The term "advertisement" is used herein as not limited to just display advertising, but may also include listings.

While the preferred mode and best mode for carrying out the invention have been described, those familiar with the art to which this invention relates will appreciate that various alternative designs and embodiments for practicing the invention are possible, and will fall within the scope of the following claims.

What is claimed is:

1. A method for providing an advertisement for display on a computer system, comprising the steps of:

storing at least one of a plurality of part identifications, wherein each part identification is a character string identified with at least one particular product;

storing contact information for at least one seller selling the at least one particular product;

storing advertising information for the at least one seller wishing to advertise the at least one particular product;

receiving the at least one of a plurality of part identifications from a user request;

triggering at least one triggered advertisement related to the at least one particular product to be immediately displayed if:

the user is associated with a pre-determined desired group corresponding to the triggered advertisement, and the user is not associated with a pre-determined no-show group corresponding to the triggered advertisement;

wherein the at least one triggered advertisement is triggered by comparing the at least one of a plurality of part identifications with stored sellers wishing to advertise particular products identified by the at least one of a plurality of part identifications;

triggering a communication relating information about the user to at least one seller, wherein the communication is triggered by comparing the least one of a plurality of part identifications with stored sellers wishing to sell particular products identified by the at least one of a plurality of part identifications.

2. The method of claim 1, wherein the triggering step further includes determining whether the triggered advertisement has exceeded a pre-determined maximum number of showings.

3. The method of claim 1, further comprising the step of notifying an advertiser associated with the advertisement of the triggered advertisement and the user.

4. The method of claim 3, wherein the notifying step is substantially simultaneously with the triggering step.

5. The method of claim 3, wherein the notifying step is subsequent to the triggering step.

6. The method of claim 1, further comprising the step, responsive to the user request, of searching for stored information concerning a part corresponding to at least one part identification.

7. The method of claim 1, further comprising the step of transmitting the triggered advertisement to the user.

8. The method of claim 1, further comprising the step of classifying the user by type within a vertical industry.

9. The method of claim 8, wherein the classifying step includes storing an indication from the user of one of a plurality of subtypes for a vertical industry.

10. The method of claim 1, further comprising the steps of storing, for each of a plurality of advertisers, a plurality of part identifications; storing, for each of a portion of part identifications for at least one advertiser of the plurality of advertisers, the triggered advertisement; and wherein the triggering step further includes triggering if (iii) at least one of the received part identifications is included in the portion of part identification.

11. The method of claim 1, further comprising the step of, for each of a plurality of users including the user, classifying the users with a group corresponding to the triggered advertisement.

12. The method of claim 1, further comprising the step of, for a portion of a plurality of users including the user, classifying the portion of users with a set corresponding to a no-show set.

13. A system for providing an advertisement for display on a computer system, comprising:

means for storing at least one of a plurality of part identifications, wherein each part identification is a character string identified with at least one particular product;

means for storing contact information for at least one seller selling the at least one particular product;

means for storing advertising information for the at least one seller wishing to advertise the at least one particular product;

means for receiving the at least one of a plurality of part identifications from a user request;

means for triggering at least one triggered advertisement related to the at least one particular product to be immediately displayed if:

the user is associated with a pre-determined desired group corresponding to the triggered advertisement, and the user is not associated with a pre-determined no-show group corresponding to the triggered advertisement;

wherein the at least one triggered advertisement is triggered by comparing the at least one of a plurality of part identifications with stored sellers wishing to advertise particular products identified by the at least one of a plurality of part identifications;

means for triggering a communication relating information about the user to at least one seller, wherein the communication is triggered by comparing the at least one of a plurality of part identifications with stored sellers wishing to sell particular products identified by the at least one of a plurality of part identifications.

14. They system of claim 13, wherein the triggered advertisement is to be displayed only if the triggered advertisement has not exceeded a pre-determined maximum number of showings.

15. The system of claim 13, wherein each triggered advertisement is associated with one of a plurality of advertisers, and further comprising an electronic notification transmitted to an advertiser associated with the advertisement of the triggered advertisement and the user.

16. The system of claim 13, further comprising a search engine, responsive to the at least one part identification, for returning stored information concerning a part corresponding to at least one identification.

17. The system of claim 13, further comprising a transmission of the triggered advertisement to the user.

18. The system of claim 13, further comprising stored classification information classifying the user by type within a vertical industry.

19. The system of claim 18, wherein the stored classification information includes an indication from the user of one of a plurality of subtypes for a vertical industry.

20. The system of claim 13, further comprising storage, for each of a plurality of advertisers, of a plurality of part identifications; storage, for each of a portion of part identifications, of at least one advertiser of the plurality of advertisers and the triggered advertisement; and wherein the condition of step 13 includes (iii) at least one of the received part identifications is included in the portion of part identifications.

21. The system of claim 13, wherein, for a each of a plurality of users including the user, the users are classified with a group corresponding to the triggered advertisement.

22. The system of claim 13, wherein, for a portion of a plurality of users including the user, the portion of users are classified with a set corresponding to a no-show set.

23. The system of claim 13, wherein, for a portion of a plurality of users including the user, the portion of users are classified with a group corresponding to a show group.

24. The method of claim 1, further comprising the step of sending an advertisement to be displayed where the user is associated with a pre-determined show group.

* * * * *